J. A. SPENCER.
SPIRIT LEVEL FOR AEROPLANES.
APPLICATION FILED SEPT. 10, 1917.
1,264,705.
Patented Apr. 30, 1918.
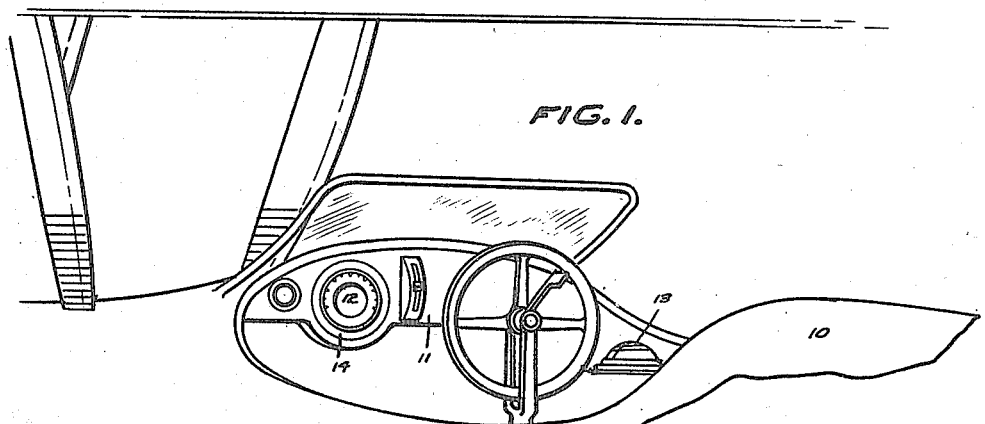
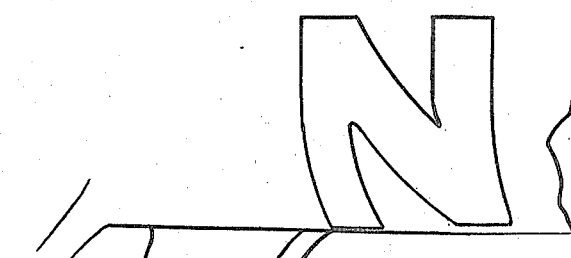
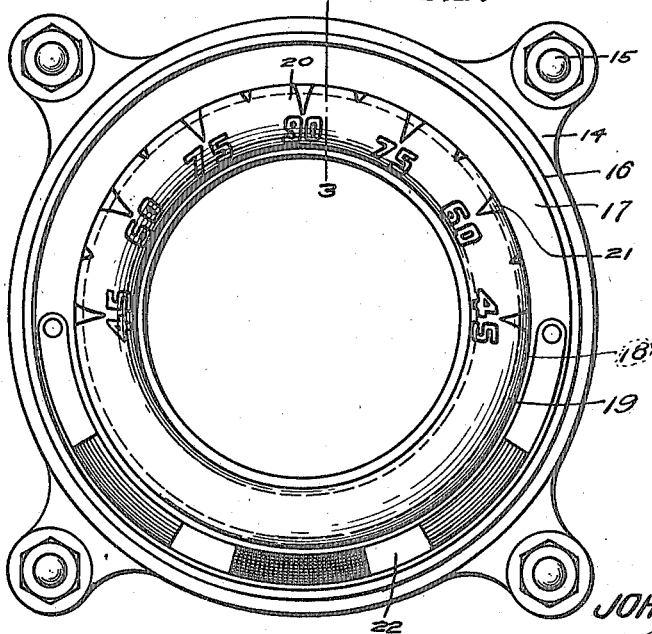
INVENTOR
JOHN A SPENCER
BY Hazard & Miller
ATT'YS

UNITED STATES PATENT OFFICE.

JOHN A. SPENCER, OF LONG BEACH, CALIFORNIA.

SPIRIT-LEVEL FOR AEROPLANES.

1,264,705.

Specification of Letters Patent. Patented Apr. 30, 1918.

Application filed September 10, 1917. Serial No. 190,645.

*To all whom it may concern:*

Be it known that I, JOHN A. SPENCER, a citizen of the United States, residing at Long Beach, in the county of Los Angeles and State of California, have invented new and useful Improvements in Spirit-Levels for Aeroplanes, of which the following is a specification.

My object is to improve the details of a spirit level especially adapted for use in aeroplanes.

Figure 1 is a fragmentary view in perspective illustrating the applications of two forms of the device.

Fig. 2 is an enlarged view in elevation illustrating the spirit level adapted for use as a banking indicator.

Fig. 3 is a view in section as seen on the line 3—3 of Fig. 2 illustrating the manner in which the glass of the indicator is mounted.

Referring more particularly to the drawings, 10 indicates the body of an aeroplane, beneath the cowl of which is mounted a transversely disposed instrument board 11. Secured upon this instrument board is a banking indicator 12 with which the present invention is concerned. Secured along the side of the body and extending longitudinally thereof is an incidence indicator 13.

The banking indicator is particularly shown in Fig. 2 as having a mounting plate 14 adapted to be bolted to the instrument board by bolts 15. This plate has a central threaded opening 16 within which an externally threaded indicator disk 17 is adjustably mounted. An annular groove 18 is formed upon the face of this disk and is preferably semi-circular in sectional contour. Fixed within this groove is a continuous annular glass tube 19 within which a liquid is placed. The tube may be held in the groove in numerous ways such as by the use of cement. The tube is so filled as to form a bubble 20, as is common in spirit levels. As the tube 19 is mounted in a substantially vertical plane, rotation of the indicator around the center of the tube will cause the tube to move in relation to the bubble. For this reason graduating marks 21 are formed upon the tube and distributed at equal distances therearound to indicate the angle at which the aeroplane is banked. For convenience these graduations are designated by numerals. In order that the indicator will designate the position of the aeroplane while overturned, a colored indicating field 22 is placed along the disk 17 and beneath the tube 19 as it stands in its normal position. This field will be uppermost when the aeroplane has turned over, and as the bubble registers therewith will indicate this position.

In operation the banking indicator is mounted as shown in Fig. 2 with graduation "90" extending in a position substantially in vertical alinement with the center of the tube 19. This point may be adjusted by rotation of the disk 17 within the mounting plate 14 as will be understood.

It will thus be seen that the device here disclosed is simple in its construction, inexpensive in manufacture, and may be readily read when desired.

I claim:

In a spirit level for aeroplanes, a mounting plate adapted to be bolted to an instrument board and having a central threaded opening, an indicator disk screw-seated in the opening and having an annular groove in its front face, and an annular glass tube mounted in the groove; the tube being so filled with liquid as to form a bubble; there being graduation marks upon the tube to indicate angles, and marks upon the indicator disk to differentiate the top from the bottom.

In testimony whereof I have signed my name to this specification.

JOHN A. SPENCER.